Jan. 5, 1932. L. G. SYMONS 1,839,615
SCREEN
Filed March 6, 1930 4 Sheets-Sheet 2
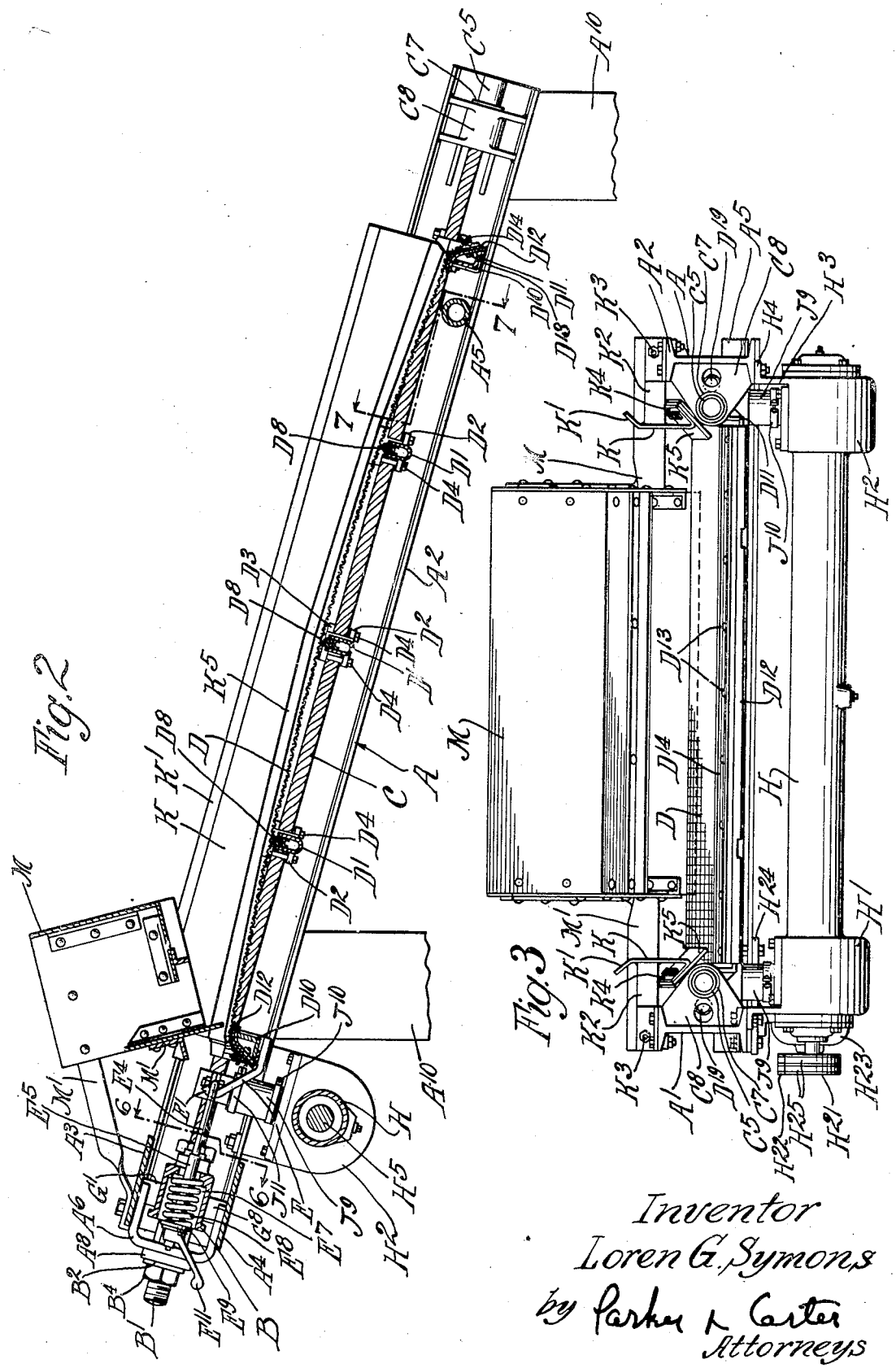
Inventor
Loren G. Symons
by Parker & Carter
Attorneys

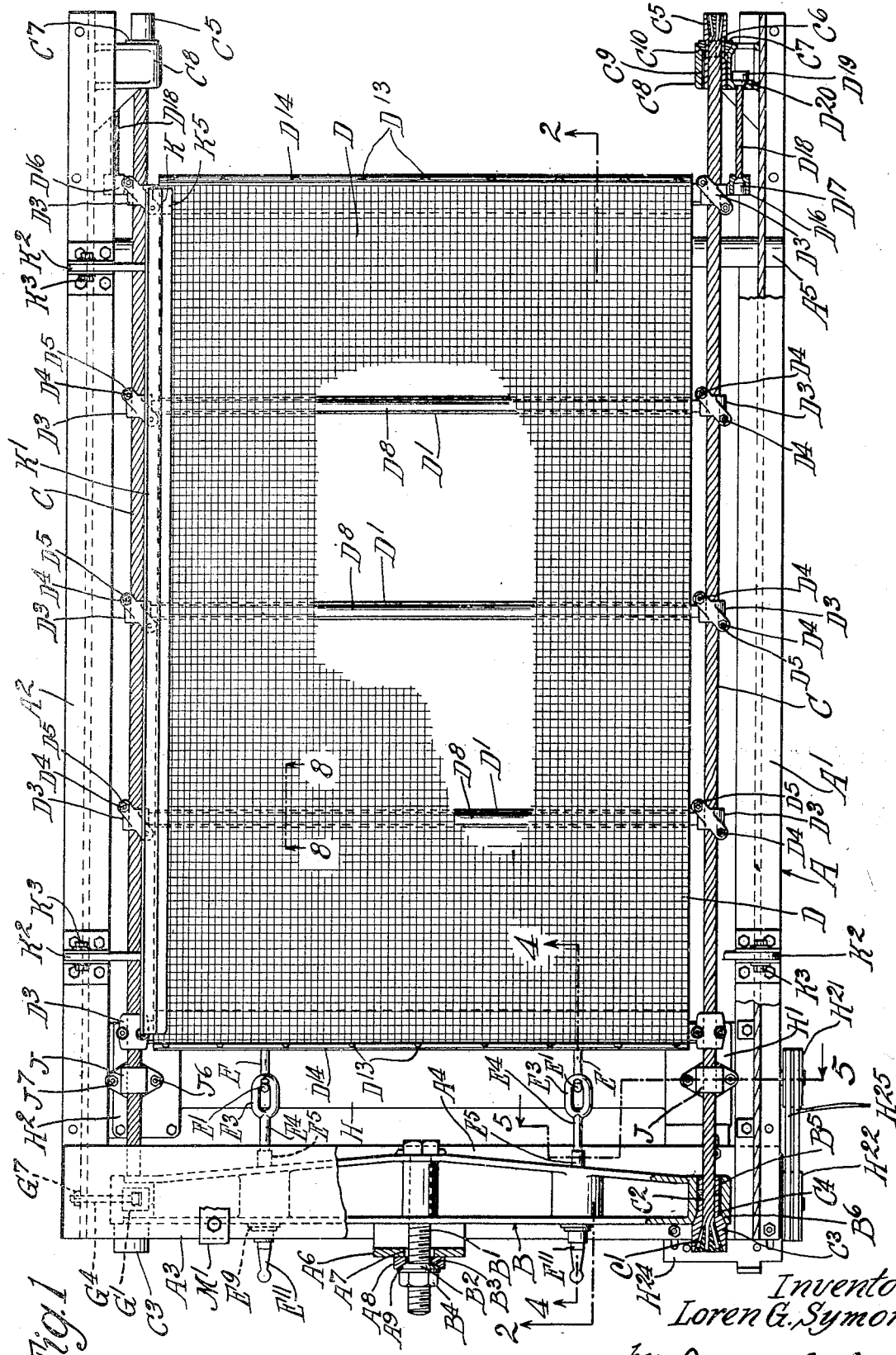

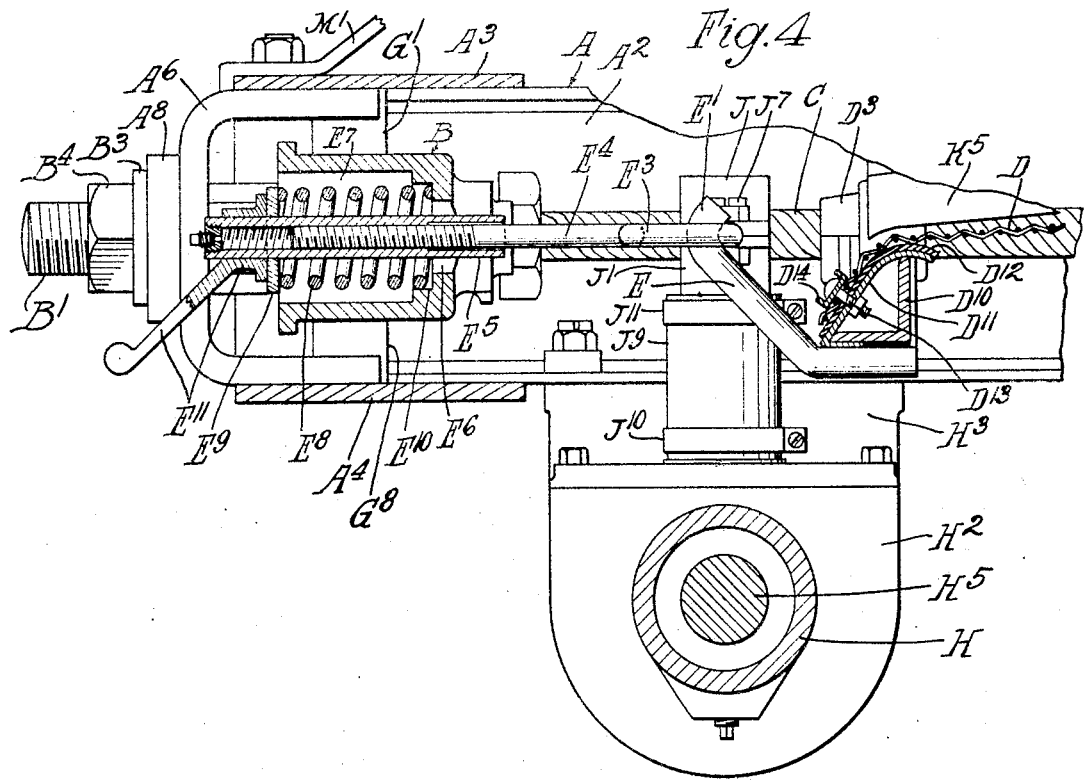
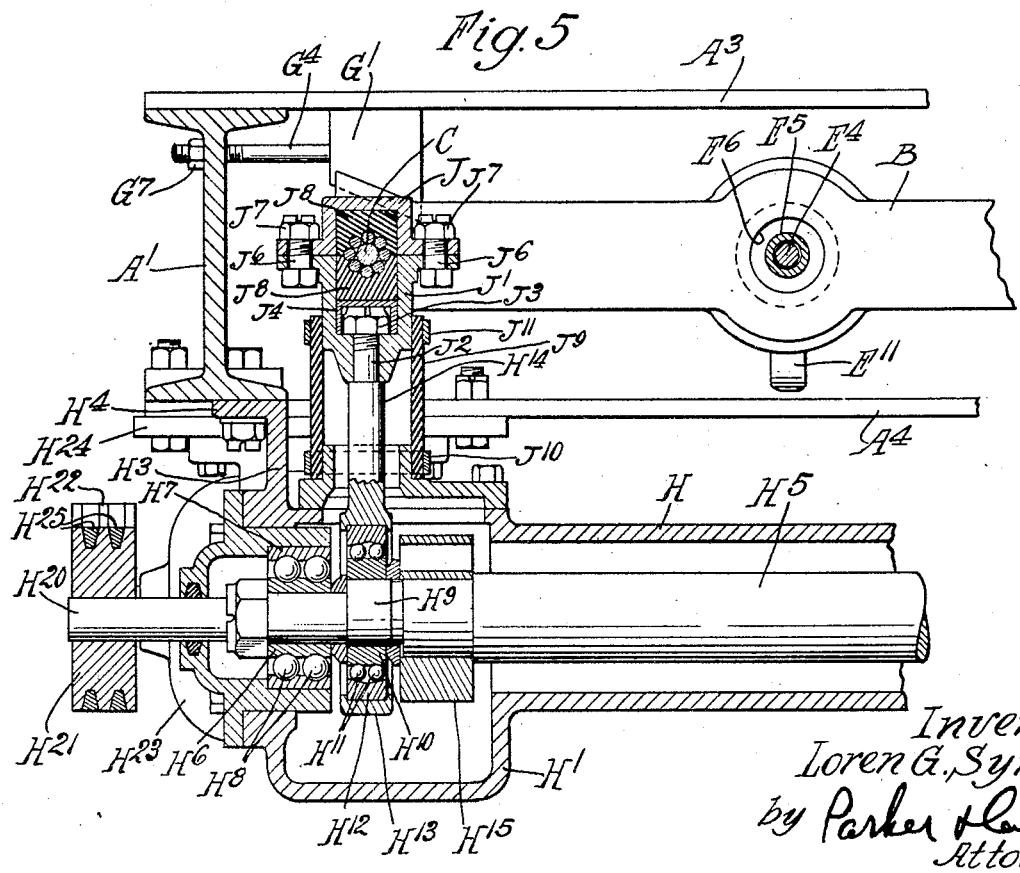

Jan. 5, 1932.  L. G. SYMONS  1,839,615
SCREEN
Filed March 6, 1930   4 Sheets-Sheet 4
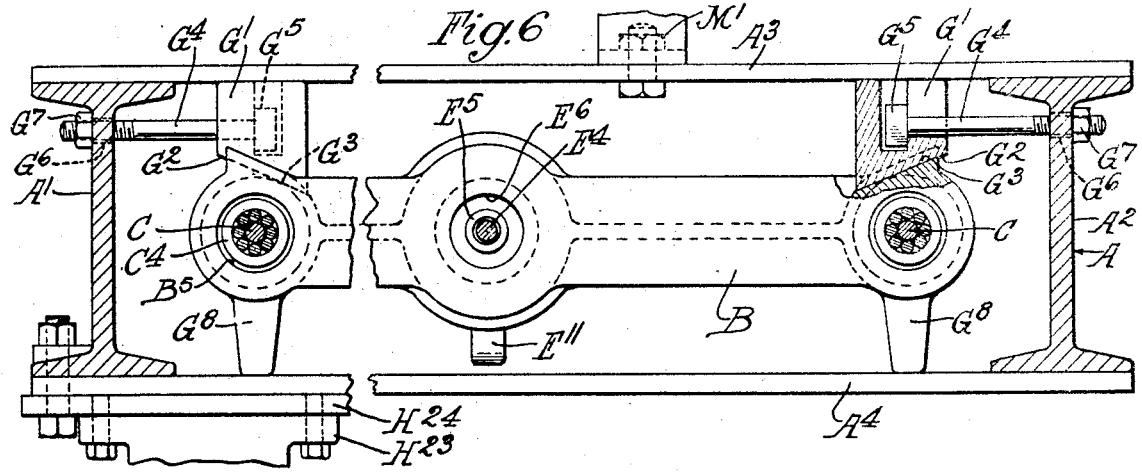
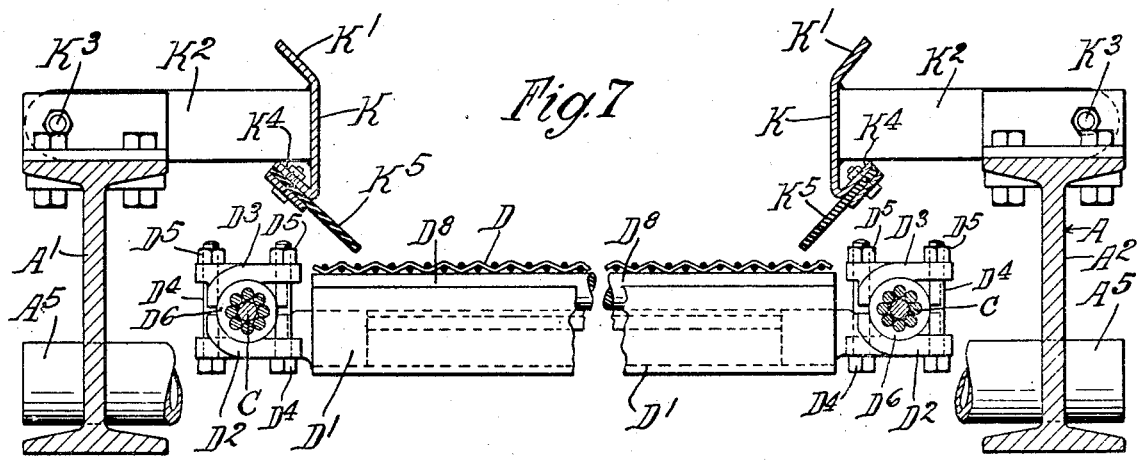
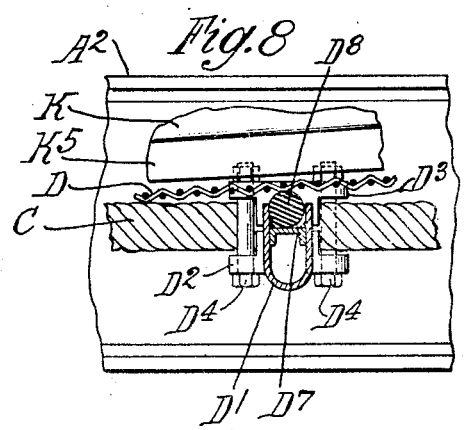
Inventor
Loren G. Symons
by Parker & Carter
Attorneys.

Patented Jan. 5, 1932

1,839,615

UNITED STATES PATENT OFFICE

LOREN G. SYMONS, OF HOLLYWOOD, CALIFORNIA, ASSIGNOR TO SYMONS BROTHERS DEVELOPMENT COMPANY, OF LOS ANGELES, CALIFORNIA, A CORPORATION OF DELAWARE

SCREEN

Application filed March 6, 1930. Serial No. 433,535.

My invention relates to an improvement in screens and relates particularly to an improved vibratory screen in which the screen or screen cloth is supported upon flexible members such as cables. One object of the invention is the provision of such a screen which shall be flexible from end to end and to which may be imparted a wave-like vibration, the waves of which may pass from end to end of the screen. Another object is the provision of such a screen in which the sides or side edges of the screen shall be flexible, tensioning means for the screen being provided in association with the ends of the screen. Another object is the provision of means for varying the tension upon the screen. Other objects will appear from time to time in the course of the specification and claims.

I illustrate my invention more or less diagrammatically in the accompanying drawings, wherein—

Figure 1 is a plan view with parts broken away;

Figure 2 is a section on the line 2—2 of Figure 1;

Figure 3 is an end view with the foundation omitted;

Figure 4 is an enlarged section on the line 4—4 of Figure 1;

Figure 5 is an enlarged section on the line 5—5 of Figure 1;

Figure 6 is an enlarged section on the line 6—6 of Figure 2;

Figure 7 is an enlarged section on the line 7—7 of Figure 2; and

Figure 8 is an enlarged section on the line 8—8 of Figure 1.

Like parts are indicated by like symbols throughout the specification and drawings.

Referring to the drawings, A generally indicates any suitable frame member, of which I show the opposite side channel members $A^1$ $A^2$ the upper ends of which may be connected as by the transverse end members $A^3$ $A^4$. $A^{10}$ indicates any suitable supports for the frame, whereby the frame is maintained, in inclined position, as is indicated in Figure 2. $A^5$ indicates a tubular transverse support connecting the members $A^1$ $A^2$ adjacent their lower ends. $A^6$ is an abutment member associated with and interposed between the transverse members $A^3$ $A^4$. It is apertured as at $A^7$ the aperture being surrounded by a socket member $A^8$ having the spherical bearing surface $A^9$.

Mounted between the transverse members $A^3$ $A^4$ is a yoke B. Mounted centrally of the yoke as a tensional member $B^1$ shown as a screwthreaded rod or bolt upon which is mounted a bearing member $B^2$ having a generally spherical bearing surface $A^9$. $B^4$ is any suitable lock nut for adjustably positioning or locking the member $B^2$. Each end of the yoke B is apertured as at $B^5$ such aperture having an enlarged or outwardly flared portion $B^6$.

Passing through each such aperture $B^5$ is a cable C, preferably of metal wire. Each end of said cable C may be enlarged as at $C^1$. For example the wire may be frayed apart and filled in with lead or any suitable substance. $C^2$ indicates a surrounding sleeve or sheath positioned at the end of the cable C which passes through the aperture $B^5$ of the yoke B. It is enlarged and strengthened as at $C^3$ to surround the enlarged portion $C^1$ of the cable. $C^4$ indicates a bearing surface upon the enlarged portion adapted to set in the enlargement $B^3$ of each aperture $B^5$. At the opposite end of each cable C is a similar sleeve or sheath $C^5$ grooved as at $C^6$ to receive the split bearing ring $C^7$ opposed to a corresponding bearing surface $C^{10}$ in a securing bracket $C^8$ positioned at the lower end of each of the side frame members $A^1$ or $A^2$. The bracket $C^8$ is penetrated by an aperture $C^9$ of which a portion $C^{10}$ is an enlargement. It will be understood that the sleeve $C^5$ which carries the cable C passes through the aperture $C^9$.

Mounted upon the parallel cables C is the screen portion proper which includes the mesh or screen cloth D. In order to support the screen cloth intermediate its ends are a plurality of transverse stops $D^1$ each of which terminates in a jaw or clamp member $D^2$ adapted to engage one side, herein shown as the lower side, of one of the cables C. An opposed clamp member $D^3$ engages the opposite side of the cable, the two clamp members being connected for example by the bolts $D^4$ with their nuts $D^5$. $D^6$ indicates any suitable and preferably yielding sleeve surrounding the cable C and preventing a metal to metal contact between the support $D^1$ and the cable. The upper face of the support $D^1$ may be channeled as at $D^7$ to receive the transverse yielding member $D^8$ upon the top of which the screen cloth D rests. Referring for example to Figures 1 and 2 I illustrate three of the transverse supports above described, intermediate the ends of the screen cloth, but I do not wish to be limited to any specific number or spacing thereof. For the lower end of the screen I employ the transverse support shown, as in Figure 2 as the angle $D^{10}$ to which is secured the transverse member $D^{11}$, which, in turn, has mounted thereupon a thin layer $D^{12}$ of yielding material which is actually engaged by the screen cloth. The screen may be secured in position for example by the bolts $D^{13}$ which pass through the members $D^{11}$ $D^{13}$ and through the clamping member or transverse strip $D^{14}$ which engages the top of the screen. The ends of the transverse member $D^{10}$ may be secured to the cables C as by clamps similar to the clamping members $D^2$ $D^3$ above described. Associated with such clamping members, however, is a lateral extension in the form of a socket or sleeve $D^{16}$ apertured to receive the enlarged end $D^{17}$ of a short cable $D^{18}$, the opposite enlarged end $D^{19}$ of which fits in a socket $D^{20}$ in the previously described bracket $C^3$. It will be understood that the lower end of the screen is thus rigidly fixed in relation to said bracket.

For securing the upper end of the screen I may employ another of the transverse securing members $D^{10}$, the attendant parts being the same as above described. However, the upper transverse support $D^{10}$, is shown as having secured to it intermediate its ends hooks E, E, having upturned end hook portions $E^1$ which pass through eyelets $E^3$ at the ends of tensional members $E^4$. The opposite ends of the members $E^4$ are screwthreaded into the sleeves $E^5$ which pass through apertures $E^6$ in the yoke B and penetrate the sockets $E^7$ in such yoke. Positioned in each such socket, is the spring $E^8$. $E^9$ indicates an abutment, the springs $E^8$ being compressed between such abutment $E^9$ about the internally threaded sleeve $E^5$, and the seat $E^{10}$ formed within the socket $E^7$, about the aperture $E^6$. $E^{11}$ is a handle secured to and controlling the sleeve $E^5$ screwthreaded to the stem $E^4$, whereby the compression to which the spring $E^8$ is subjected may be varied, thus varying the tension exerted upon the members $E^4$ and thus upon the hooks E. It will be observed from Figure 2 that the transverse members $D^{10}$ are positioned below the general plane of the cables C. Thus the exercise of tension upon the upper edge of the screen D draws the screen cloth down upon and against the transverse supports $D^1$ or the yielding abutments $D^8$ thereof, thus making unnecessary the application of intermediate clamping members to or through the surface of the screen.

It will be understood that the transverse yoke B serves as the means for applying tension both to the cables C and to the screen mesh D itself, the tension being, however, independently controllable. The yoke B, in order to equalize the tension across the width of the screen, is pivotally mounted, as above described. In order to maintain it constantly in the place of the screen I employ the structure shown in Figure 6.

Positioned between the top transverse end member $A^3$ and the upper side of the yoke B are the slidable blocks $G^1$, each having an inclined guide or wedging surface $G^2$ conforming generally to an opposed surface $G^3$ upon the upper side of the end of the transverse yoke B. These blocks are adjustably mounted, as by the bolts $G^4$ with their heads $G^5$ socketed in the blocks. These bolts pass through the webs of the side members $A^1$ $A^2$ as at $G^6$, and may be secured and adjusted as by the nuts $G^7$. Depending from the lower face of the ends of the member B are flanges or studs $G^8$ engaging the lower transverse end member $A^4$. Thus any tilting of the member B out of the normal plane of the screen is prevented. The blocks $G^1$ are preferably tightly set as to prevent any tilting or movement of the yoke B, said yoke being clamped or wedged between the lower and upper transverse end members $A^3$ $A^4$.

In order to impart vibration to the cables C, and thus to the screen D, I provide the vibratory structure below described. A transverse housing H, with terminal enlargements $H^1$ $H^2$ is positioned beneath and mounted upon the frame. I may employ for example the supporting webs $H^3$ with their flanges $H^4$, which may be bolted to the longitudinal frame members $A^1$ $A^2$. Mounted for rotation within the housing H is any suitable shaft or rotary member $H^5$. It may be provided at each end with an inner ball race $H^6$ fixed on the shaft, an outer ball race $H^7$, and the intervening ball bearings $H^8$. Figure 5 generally illustrates an eccentric at one end of the shaft $H^5$ and it will be understood that a corresponding eccentric and actuating structure is associated with the opposite end. Referring again to Figure 5, $H^9$ indicates a cylindrical eccentric member surrounded by the inner ball race $H^{10}$, the ball bearings $H^{11}$ and the outer race $H^{12}$. The outer race is mounted in the eye of a vibration transmitting link which includes the annular member $H^{13}$ and the shaft or stem $H^{14}$ extending upwardly therefrom. $H^{15}$ is any suitable counterweight associated with the shaft $H^5$.

In order to transmit movement of the element $H^{14}$ to the cables C, I provide a clamping structure which includes the upper clamp element J and the lower clamp element $J^1$. The lower element $J^1$ may be secured to the connector $H^{14}$, as by the screw threaded bolt portion $J^2$ and $J^3$. $J^4$ is a spacer about said nut. The clamp elements J $J^1$ may be secured together as by the bolts $J^6$ and the nuts $J^7$. $J^8$ $J^8$ are yielding pads associated with the clamp member, one engaging the upper and the other the lower side of the cable C. These pads serve to prevent a metal to metal contact and to more or less cushioning connection between the connector $H^{14}$ and the cable, thus limiting wear.

In order to prevent the access of dust to the working parts and to reduce the lubricating problem I provide a flexible connection between the above described clamp structure and the enlarged housing portion $H^1$. This may take the form of a flexible member $J^9$, herein shown as tubular the ends of which may be clamped into dust proof engagement with the housing portion $H^1$ and the clamp structure $J^1$ respectively, as by the rings $J^{10}$ $J^{11}$.

I may provide any suitable means for rotating the shaft $H^5$ and as an illustration of a practical method I illustrate the shaft extension $H^{20}$ with the pulley $H^{21}$ thereupon. $H^{22}$ is a driving pulley which may be actuated as by the motor $H^{23}$ mounted upon a base plate $H^{24}$ which may be adjustably secured and bolted to the frame A as illustrated in Figures 1, 3, and 5. $H^{25}$ are belts about the pulleys $H^{21}$ and $H^{22}$.

In order further to constrain the material passing over the screen to longitudinal travel along the screen, and to prevent it from escaping from the edge of the screen I provide the guiding walls or strips K generally overlying, or closely adjacent to, the edge of the screen D. The walls K, which are upwardly flared at their upper edge as at $K^1$ are mounted upon arms $K^2$ which may be pivoted as at $K^3$ to brackets mounted upon the upper flanges of the side members $A^1$ $A^2$. The members K are offset and upwardly and outwardly inclined as at $K^4$, and to this terminal inclined portion $K_4$ are secured by any suitable means flexible members $K^5$. These flexible members incline downwardly and inwardly toward the screen D and terminate closely adjacent the upper face of the screen. Mounted above the screen D adjacent the upper end thereof is a feed chute M which may be mounted upon and positioned as by the supporting members $M^1$, said members may be welded or bolted upon the frame A. The feed chute M as illustrated in Figures 2 and 3, may be of any suitable shape and size.

It will be realized that whereas I have described and shown a practical and operative device, nevertheless many changes might be made in the size, shape, number and disposition of parts without departing from the spirit of my invention. I therefore wish my description and drawings to be taken as in a broad sense illustrative and diagrammatic rather than as limiting me to my specific showing. In particular I wish it to be understood that mere variations in proportion or location of parts do not depart from my invention. Where in certain of the claims I describe cables as extending from end to end of a screen member it will be understood that such claims are to be interpreted sufficiently broadly to cover a screen in which the distance between the cables exceeds the length of the screen.

The use and operation of my invention are as follows:

I provide herein a screen member to which may be imparted a wave-like vibration. In practice I find it desirable and adding highly to the efficiency of the screen that the amplitude of vibration be as nearly as possible uniform throughout substantially all points on the effective screening area. I impart the desired vibration to my screen by supporting the mesh D upon flexible supporting members, for example the cables C, which extend along opposite edges of the screen and which not only flexibly support the screen, permitting it to flex freely, but are themselves the intermediary between the vibration imparting mechanism and the screen, and transmit to the screen the vibration which they receive. In order to cause the screen to vibrate completely in unison with the members $D^{10}$ $D^1$ I mount the screen upon the relatively rigid transverse members $D^{10}$ $D^1$ and clamp the screen only to the end members $D^{10}$ as illustrated in Figures 1 to 4. The result is a screen which will flex transversely of its ends but which will not flex longitudinally. Hence I may impart to the screen a uni-directional wave-like vibration, and the crests and troughs of the waves of this vibration will extend from side to side of the screen, with equal amplitude, and will move longitudinally along the screen, unimpeded by any stiffening or hampering frame or other supporting means.

As an effective means of imparting the desired vibration to the cables C I provide the eccentric structure shown in detail in Figure 5. Its effect, broadly stated, is the vertical reciprocation or oscillation of the upper end of the member $H^{14}$. The lower end, the eye $H^{13}$, is constrained to a circular oscillation by its position about the rotated eccentric $H^9$. But this movement is translated, so far as relates to the point of connection of the clamping structure with the cable, to a vertical reciprocation or oscillation. This oscillation or vibration is imparted to each cable C in unison and it is imparted to each cable adjacent their upper ends, and adjacent the upper ends of the screen. The point of application shown in Figures 2 and 4 is a convenient one. It will be understood that I might apply the vibrations elsewhere along the length of the flexible members C. Although the oscillating mechanism is mounted on the frame, it is in cushioning engagement with the cables, through the pads $J^8$. In practice, although the screen is undergoing a rapid and ample vibration, the frame does not vibrate and will not vibrate even though it may be supported loosely on the floor of a plant. The rotation of the shaft $H^5$ imparts no vibration to the frame, because the shaft is provided with proper counterweights. No vibration is imparted to the housing portion $H^1$, because its sole connection with the vibrated cables is through the flexible housing or hose $J^9$, which of course transmits no shock or vibration. It is therefore possible to employ a light, open screen frame and to employ light and simple supporting means therefor. The frame is freed from wire or vibratory distortion.

The movement of the cable resembles that of the body of a snake when crawling, the wave-like vibration, however, being in a generally vertical plane. It is true that the cable could be vibrated slowly enough to cause it to vibrate as a violin string, which would give a pronounced movement in the center of the screen, with the amplitude of vibration diminishing from the center toward both ends. But in practice in the structure shown herein, a somewhat more rapid rate of vibration causes the travel of waves lengthwise along the cable and all parts of the screen cloth supported on the cable will be given an upward movement along the full length of the cloth, with every wave set up, and a downward movement, the upward and downward movements corresponding to the difference between the crests and troughs of the waves which travel along the screen. The mechanism is actuated at such speed that the waves follow each other in rapid succession, the crests and troughs extending transversely across the screen from edge to edge, and follow each other lengthwise along the screen.

The tensional mounting of the cables is an important and probably a necessary element in the production of the wave-like movement of the cables, as when the movement is set up in the cables it has a tendency to shorten the distance from one end of the cable to the other. This tension may be adjusted and equalized by rotation of the nut $B^4$, whereby the yoke B may be released toward or drawn away from the opposite end of the screen frame. The screen D is also tensionally held by the yoke B, but this tension can be adjusted or controlled independently of the tension upon the cables, by rotation of the handles $E^{11}$, which varies the compression of the springs $E^8$. The tension upon the screen mesh draws it down upon the yielding transverse members $D^8$ which line the tops of the transverse supports $D^1$. The tension upon the screen thus holds the screen down upon the transverse supports, and insures that the screen will vibrate in unison with the vibration of the cable C. In other words this tension upon the screen prevents its flapping or giving in response to the whip of the vibration of the cable C, and thereby a uniform amplitude of vibration is maintained from side to side of the screen.

In connection with the wave-like vibration the transverse yoke or equalizer B is of great importance, as unless the tension of one cable is almost exactly the same as the tension of the other, there will be a marked difference in the length and height of the waves produced by the eccentric action. The result of the use of the yoke is not only to equalize the tension of the cables, but to equalize the rate and amplitude of vibration throughout the width of the screen. In its action the screen suggests the dusting of a carpet by holding a strip at its two corners and moving it up and down, to cause waves of vibration to travel from end to end of the carpet. In this connection will be understood the importance of providing a screen which is transversely flexible but longitudinally inflexible. I mean a screen which will flex to permit transverse waves of vibration to move from end to end of the screen, but will not flex to permit waves of vibration to move laterally across the screen. In this sense the screen is flexible transversely, but is held against longitudinal flexure.

I claim:

1. In a screen, a screen member, flexible vibrating members for opposite edges of said screen member, a frame upon which said vibrating members are mounted, connections between the ends of said vibrating members and the frame, and independent means for exerting tension upon said screen member, and upon said vibrating members.

2. The structure of claim 1 having means for adjusting or varying the tension exerted upon the screen member.

3. In a screen, a base, a yoke movably mounted upon said base, cables interposed between said base and said yoke, a screen member mounted upon said cables, means for imparting vibration to said cables and additional means, interposed between said yoke and said screen, adapted to maintain said screen under tension.

4. The structure of claim 3 having a transverse relatively rigid member to which the end of the screen member is secured, and connecting means interposed between said transverse member and the yoke.

5. The structure of claim 3 having a transverse relatively rigid member to which the end of the screen member is secured, and connecting means interposed between said transverse member and the yoke including a yielding element adapted to be compressed by the tension exerted upon the screen member.

6. In a screen, a base, cables mounted upon said base and means for vibrating them, a flexible screen member mounted upon said cables, transverse relatively rigid members extending from cable to cable and in communication with the opposite ends of said screen member, and tensional connections, independent of the cables, between each of said transverse members and the base.

7. The structure of claim 6 having tension varying means effective to vary the tension upon said screen member.

8. The structure of claim 6 having the intermediate portion of the flexible screen is positioned above the general plane of the cables.

9. In a screen, a base, a yoke movably mounted upon said base, a plurality of generally parallel cables extending between said yoke and said base, means for vibrating said cables, a flexible screen member mounted upon said cables, transverse relatively rigid members extending between said cables and in communication with the opposite ends of said screen member and tensional connections, independent of the cables, between one of said transverse members and the base, and between the other of said transverse members and the yoke.

10. The structure of claim 9 having a spring member adapted to exert tension upon said screen.

11. The structure of claim 9 having a spring member adapted to exert tension upon said screen, said spring member being interposed between the screen and the yoke.

12. The structure of claim 9 having a spring member adapted to exert tension upon said screen, and means for varying the tension exerted thereby.

13. The structure of claim 9 having a spring member adapted to exert tension upon said screen, said spring member being interposed between the screen and the yoke, and means for varying the tension exerted thereby.

14. In a screen, a base, flexible tensional supports mounted upon said base, means for vibrating them, and means for varying their tension, a flexible screen member mounted upon said supports and means for exerting tension upon said screen along a direction or axis in general parallelism with the longitudinal extension of said supports.

15. The structure of claim 14, having means for varying the tension exerted upon the screen member independently of the tension of the flexible tensional supports.

16. In a screen, a screen member, flexible supports for the opposite edges thereof, means for imparting screening vibration to said flexible supports and, therethrough, to the screen member, a plurality of transverse generally rigid supports intermediate said flexible supports, and tensional means for holding said screen against vertical movement in relation to said transverse supports.

17. The structure of claim 16 having securing means for the opposite ends of said screen member, said securing means extending transversely in relation to said flexible supports and means tending to separate said securing means and thereby to exert tension upon said screen in general parallelism with said flexible supports.

18. The structure of claim 16 having securing means for the opposite ends of said screen member, said securing means extending transversely in relation to said flexible supports and means tending to separate said securing means and thereby to exert tension upon said screen in general parallelism with said flexible supports, the transverse supports being positioned above the plane of said securing means, said securing means being adapted tensionally to draw the screen member downwardly against said transverse supports.

19. In a tensionally mounted screen, a screen member, flexible supports for the opposite edges thereof means for maintaining them under substantial longitudinal tension, means for imparting screening vibration to said flexible supports and therethrough, to the screen member, a frame upon which said flexible supports are mounted and side guiding walls positioned upon said frame, said walls being positioned adjacent the edges of the screen member and terminating at a level above the level of the screen member, and flexible wall portions extending from the lower edges of said walls toward the surface of the screen member pivotally mounted upon said frame.

20. In a screen, a screen member, flexible supports for the opposite edges thereof, means for imparting screening vibration to said flexible supports and, therethrough, to the screen member, a plurality of transverse generally rigid supports intermediate said flexible supports, and tensional means for holding said screen against vertical movement in relation to said transverse supports, the surfaces of said transverse supports in engagement with the screen being of yielding material.

21. The structure of claim 20 having securing means for the opposite ends of said screen member, said securing means extending transversely in relation to said flexible supports and means tending to separate said securing means and thereby to exert tension upon said screen in general parallelism with said flexible supports, the transverse supports being positioned above the plane of said securing means, said securing means being adapted tensionally to draw the screen member downwardly against said transverse supports.

22. In a screen, a screen member, longitudinally disposed, flexible cables along opposite edges of said member, the screen member being supported upon said cables, means for maintaining said cables under substantial longitudinal tension, and means for imparting screening vibrations to said cables and, therethrough, to the screen member, and additional means for maintaining the screen member under tension.

Signed at Hollywood, county of Los Angeles, and State of California, this 11th day of February, 1930.

LOREN G. SYMONS.